(12) United States Patent
Sirvis et al.

(10) Patent No.: US 10,518,903 B2
(45) Date of Patent: Dec. 31, 2019

(54) AERIAL VEHICLE LAUNCHER

(71) Applicant: CIRCOR AEROSPACE, INC., Hauppauge, NY (US)

(72) Inventors: Russell S. Sirvis, East Setauket, NY (US); Christopher R. Lovasco, Shoreham, NY (US); Juan Vasquez, Bohemia, NY (US); David W. Gass, Wading River, NY (US); Corey C. Jordan, Selden, NY (US); Liron Dror, Selden, NY (US); John Nellikunnel, Monmouth Junction, NJ (US); Jeffrey Horning, Farmingville, NY (US); Christopher Olsen, Bayport, NY (US)

(73) Assignee: CIRCOR AEROSPACE, INC., Hauppauge, NY (US)

( * ) Notice: Subject to any disclaimer, the term of this patent is extended or adjusted under 35 U.S.C. 154(b) by 275 days.

(21) Appl. No.: 15/583,226

(22) Filed: May 1, 2017

(65) Prior Publication Data
US 2017/0313442 A1 Nov. 2, 2017

Related U.S. Application Data

(60) Provisional application No. 62/330,574, filed on May 2, 2016.

(51) Int. Cl.
*B64C 1/06* (2006.01)
*B64C 39/02* (2006.01)
*B64F 1/06* (2006.01)

(52) U.S. Cl.
CPC .............. *B64F 1/06* (2013.01); *B64C 39/024* (2013.01); *B64C 2201/021* (2013.01); *B64C 2201/084* (2013.01)

(58) Field of Classification Search
CPC .......................... B64F 1/06; B64C 2201/084; B64C 2201/021
USPC .................................................... 244/63; 89/7
See application file for complete search history.

(56) References Cited

U.S. PATENT DOCUMENTS

| 1,960,264 A | * | 5/1934 | Heinkel | ..................... | B64F 1/06 244/63 |
| 2,672,306 A | * | 3/1954 | Doolittle | ................... | B64F 1/06 104/173.1 |
| 3,534,929 A | * | 10/1970 | Johansen | .................. | B64F 1/06 244/110 R |

(Continued)

*Primary Examiner* — Bret Hayes
(74) *Attorney, Agent, or Firm* — McNees Wallace & Nurick LLC

(57) ABSTRACT

An aerial vehicle launcher including a rail having a first end and a longitudinal axis and a piston movable in a passageway formed in the rail, the piston connected to a carriage by at least two elongate flexible members. The carriage having a support device for releasably engaging the aerial vehicle. Upon the carriage and the aerial vehicle approaching one end of the rail, the support device controllably disengaging the aerial vehicle, permitting the aerial vehicle to be launched. A device is connected to a pressurized gas source, the device controllably providing pressurized gas from the pressurized gas source to the passageway for drivingly moving the piston, the carriage, and aerial vehicle along the rail for launching the aerial vehicle. The device includes a reservoir for holding pressurized gas, the reservoir being a conduit, the pressurized gas in the reservoir providing the driving force for launching the aerial vehicle.

23 Claims, 10 Drawing Sheets

(56) References Cited

U.S. PATENT DOCUMENTS

| | | | | |
|---|---|---|---|---|
| 4,238,093 | A * | 12/1980 | Siegel | B64F 1/06 244/63 |
| 6,457,673 | B1 * | 10/2002 | Miller | B64F 1/06 244/63 |
| 7,165,745 | B2 * | 1/2007 | McGeer | B64C 39/024 244/114 R |
| 7,210,654 | B1 * | 5/2007 | Cox | B64C 39/024 244/190 |
| 7,562,843 | B2 * | 7/2009 | Lipponen | F41B 3/02 124/56 |
| 8,336,816 | B2 * | 12/2012 | Miller | B64F 1/06 244/63 |
| 2016/0347477 | A1 * | 12/2016 | Tully | B64F 1/08 |

* cited by examiner

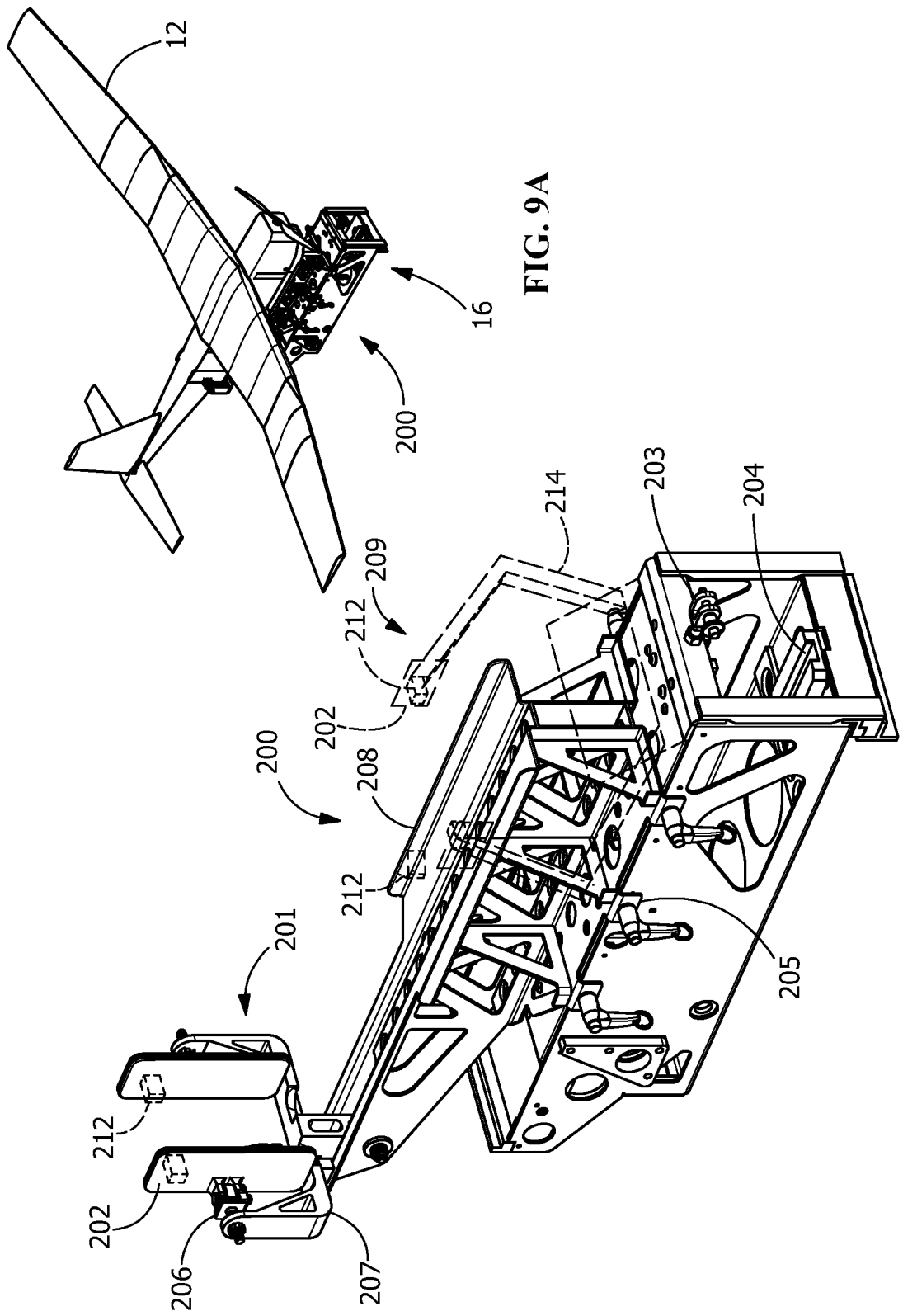

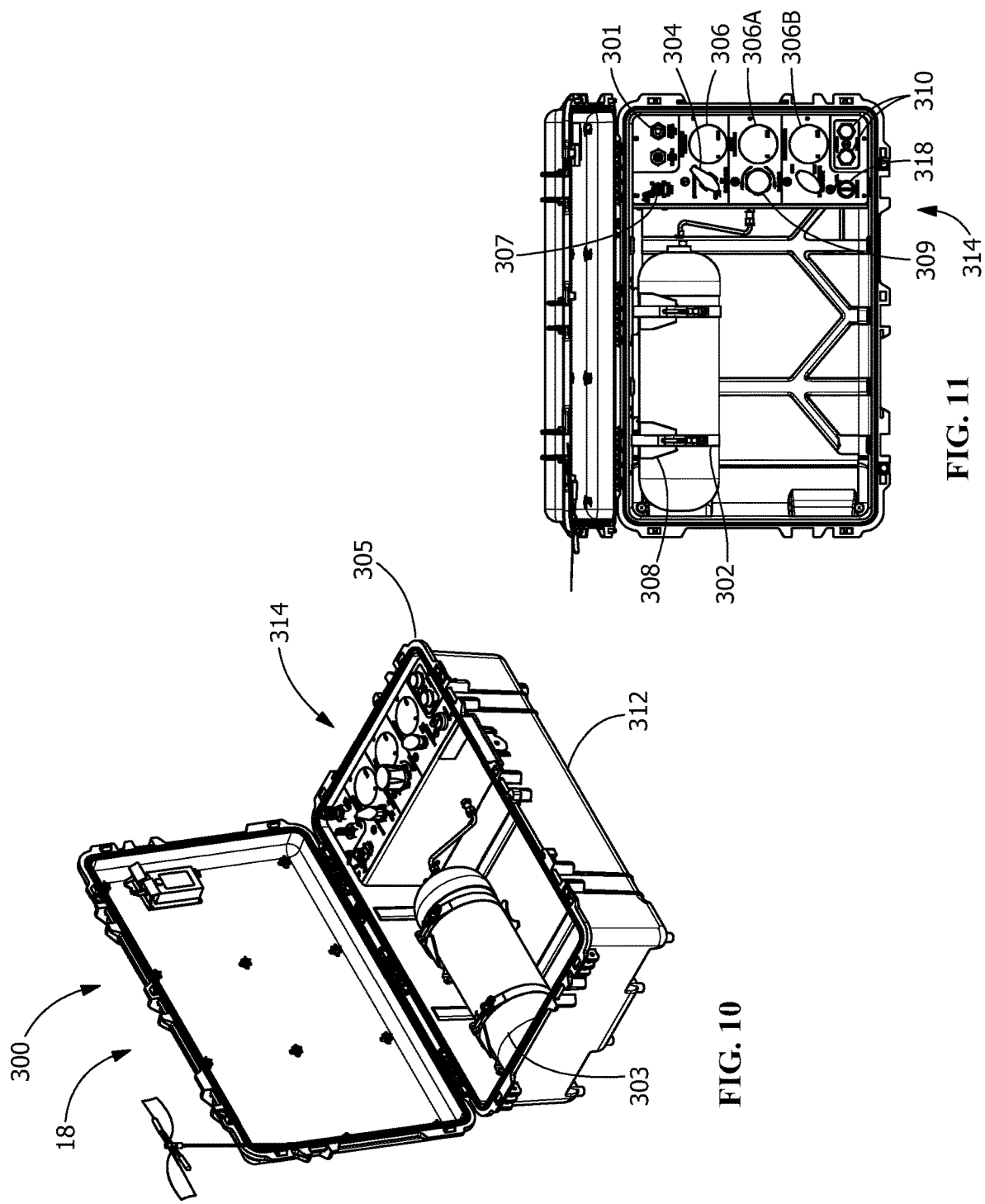

AERIAL VEHICLE LAUNCHER

FIELD OF THE INVENTION

The present invention is directed to the field of aerial vehicle launchers, and in particular, for portable aerial vehicle launchers.

BACKGROUND OF THE INVENTION

Aerial vehicles, such as unmanned aerial vehicles, may require a launcher or launching system. Such launchers typically utilize a series of high load springs to achieve the high acceleration required to reach required flight speed of the aerial vehicle in a short distance. Due to the tension requirements of these springs being immense as well as the launch event being so violent, the springs are subject to failure, requiring disruptive, frequent and often expensive routine maintenance. Additionally, these spring systems are typically heavy, requiring several operators and a utility vehicle to transport the launcher.

It would be desirable to have a launcher that does not suffer from these deficiencies, the launcher being portable, dependable, and easily and quickly assembled and disassembled.

SUMMARY OF THE INVENTION

In an embodiment, an aerial vehicle launcher includes a rail having a first end and a longitudinal axis. The launcher further provides a piston movable in a passageway formed in the rail, the piston connected to a carriage by at least two elongate flexible members. The aerial vehicle launcher further provides the carriage having a support device for releasably engaging the aerial vehicle. The aerial vehicle launcher further provides upon the carriage and the aerial vehicle approaching one end of the rail, the support device controllably disengaging the aerial vehicle, permitting the aerial vehicle to be launched from the launcher. The aerial vehicle launcher provides a device connected to a pressurized gas source, the device controllably providing pressurized gas from the pressurized gas source to the passageway for drivingly moving the piston, the carriage, and aerial vehicle along the rail for launching the aerial vehicle. The device includes a reservoir for holding gas pressurized to a predetermined level, the reservoir being a conduit, the pressurized gas in the reservoir providing the driving force for launching the aerial vehicle.

In another embodiment, a method for launching an aerial vehicle includes slidably securing a carriage to a rail having a longitudinal axis and positioning the rail at a predetermined acute angle relative to a horizontal plane. The method further includes releasably engaging the aerial vehicle to the carriage and controllably providing pressurized gas for drivingly moving the carriage and aerial vehicle along the longitudinal axis for launching the aerial vehicle. The method further includes controllably disengaging the aerial vehicle from the carriage in response to the carriage and the aerial vehicle being a predetermined spacing from an end of the rail immediately prior to launch of the aerial vehicle.

Other features and advantages of the present invention will be apparent from the following more detailed description, taken in conjunction with the accompanying drawings which illustrate, by way of example, the principles of the invention.

BRIEF DESCRIPTION OF THE DRAWINGS

FIG. 9 is an upper perspective view of an exemplary carriage.

FIG. 9A is an upper perspective view of an exemplary unmanned aerial vehicle supported by the carriage of FIG. 9.

FIG. 10 is an upper perspective view of an exemplary embodiment of a pneumatic control system.

FIG. 11 is a plan view of the pneumatic control system of FIG. 10.

DETAILED DESCRIPTION OF THE INVENTION

Figure 1:
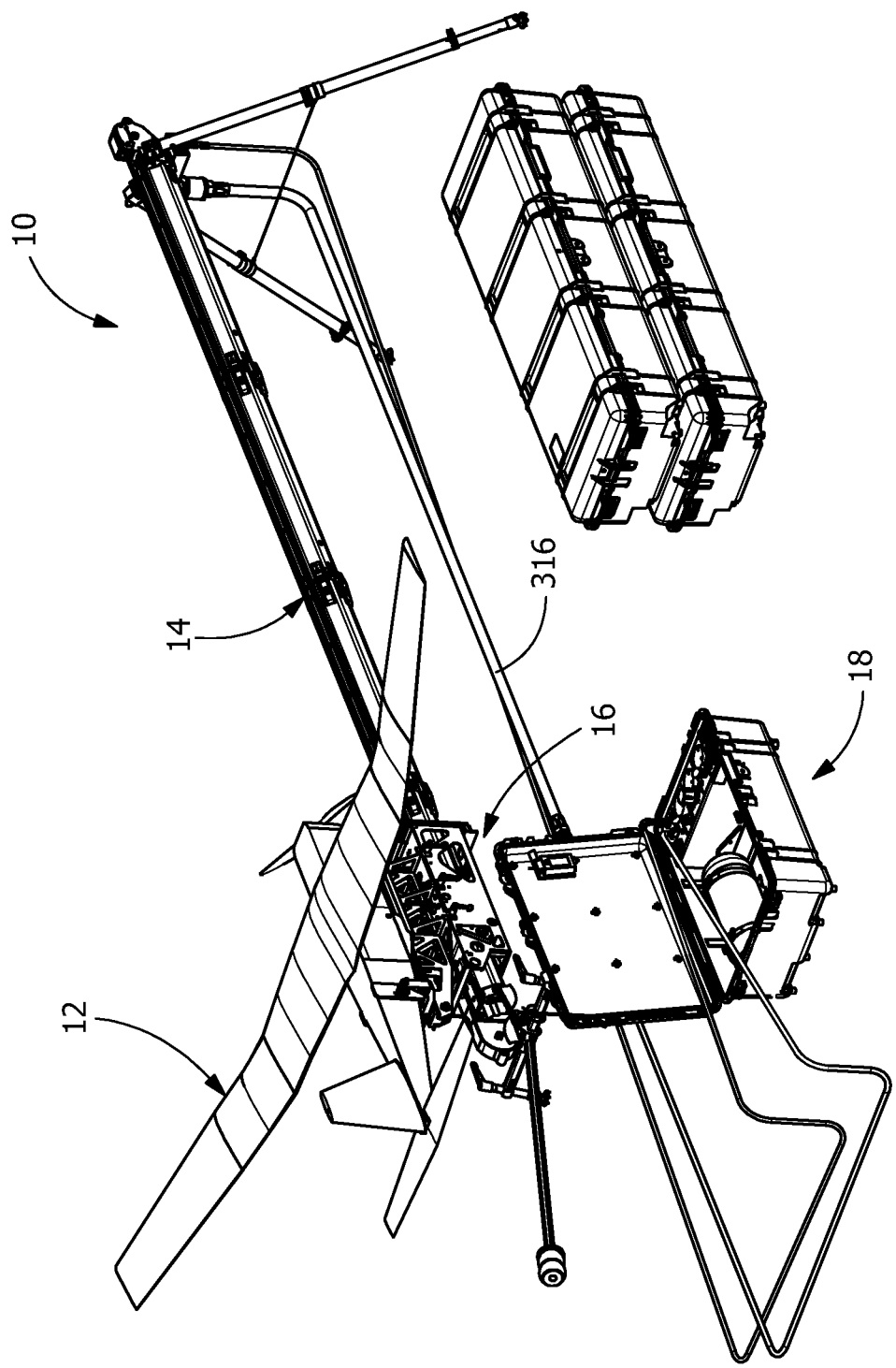
FIG. 1 is an upper perspective view of an exemplary embodiment of a launcher.
Figure 2:
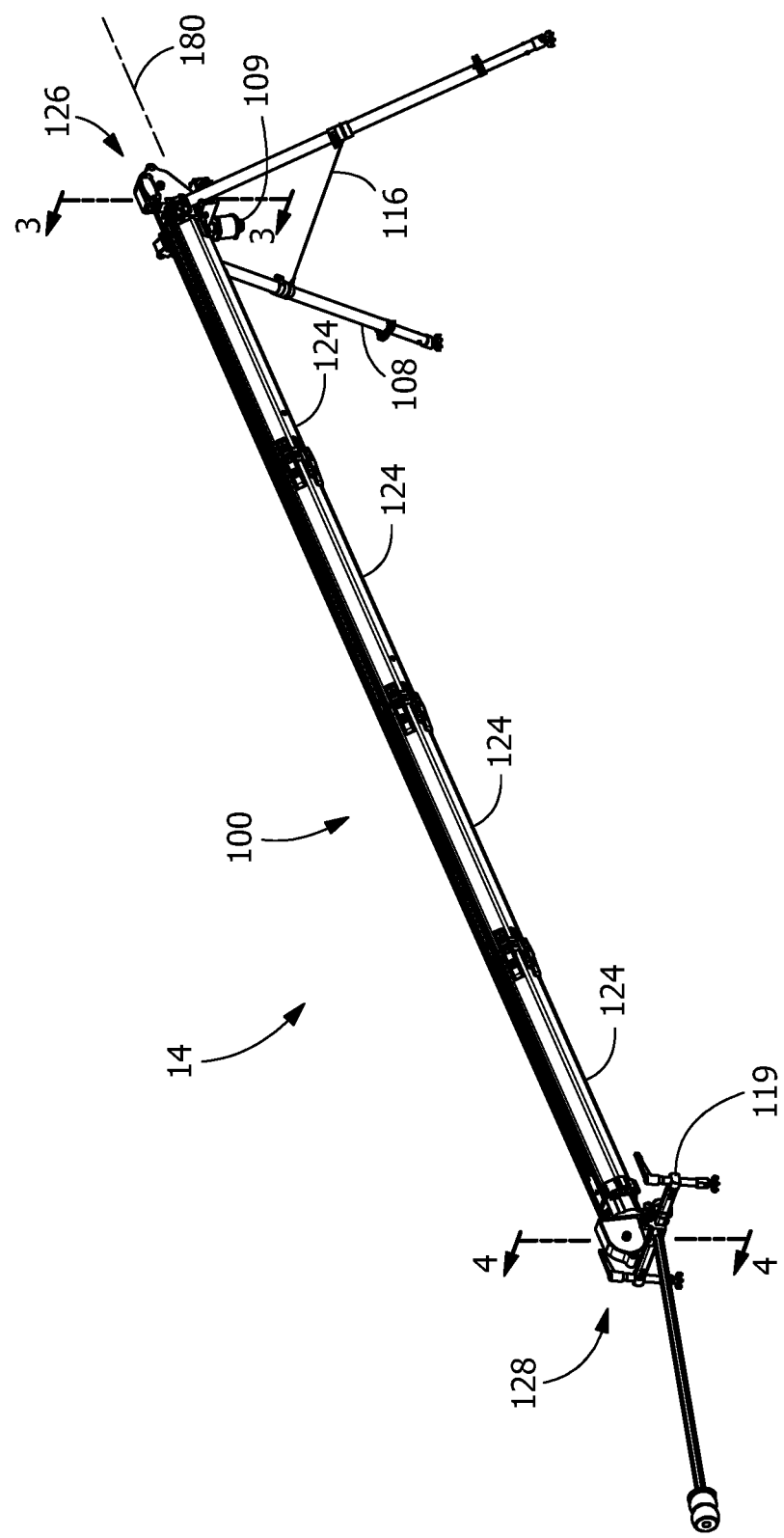
FIG. 2 is an enlarged upper perspective view of a rail from the launcher of FIG. 1.
Figure 3:
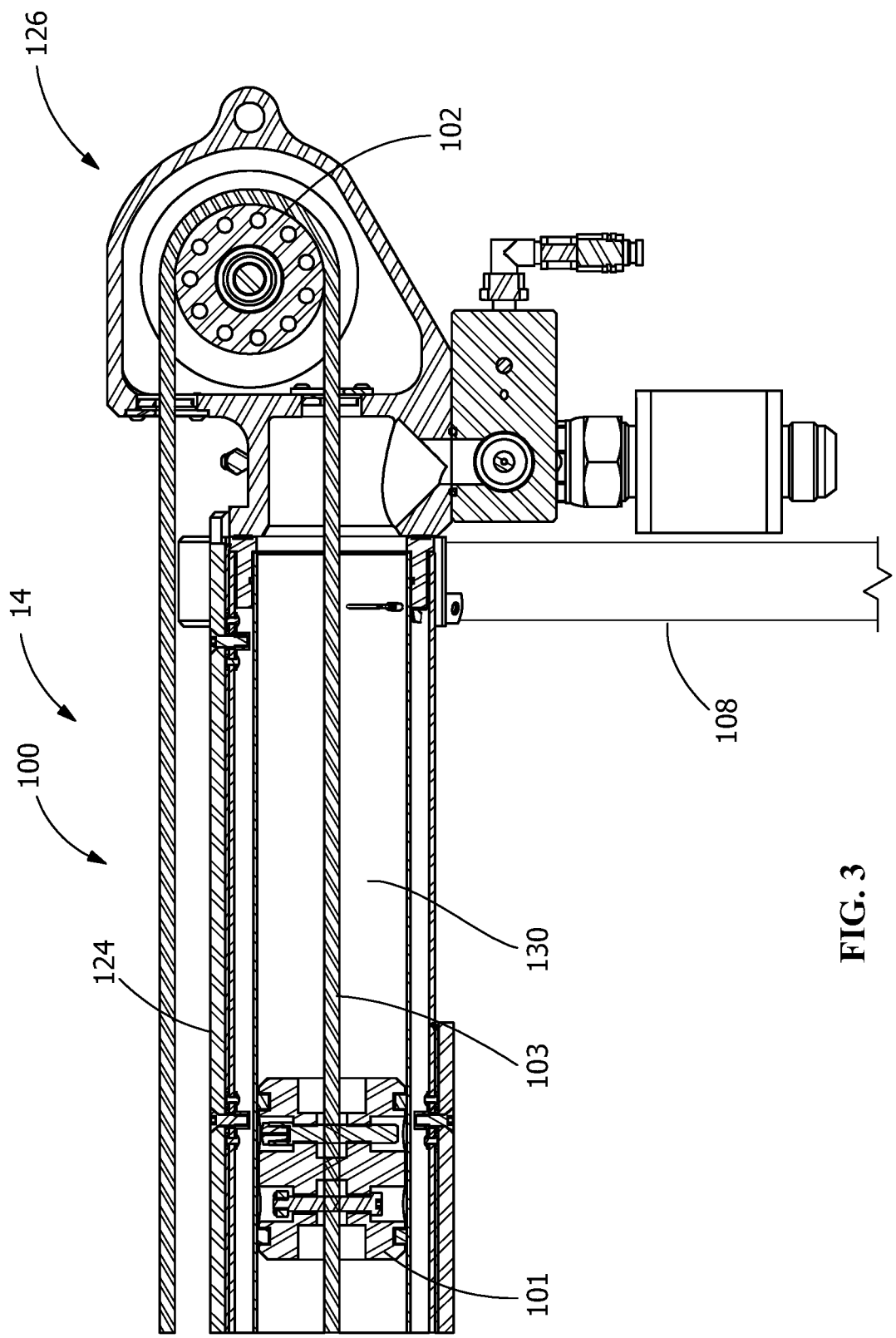
FIG. 3 is a cross-section taken along line 3-3 from FIG. 2.
Figure 4:
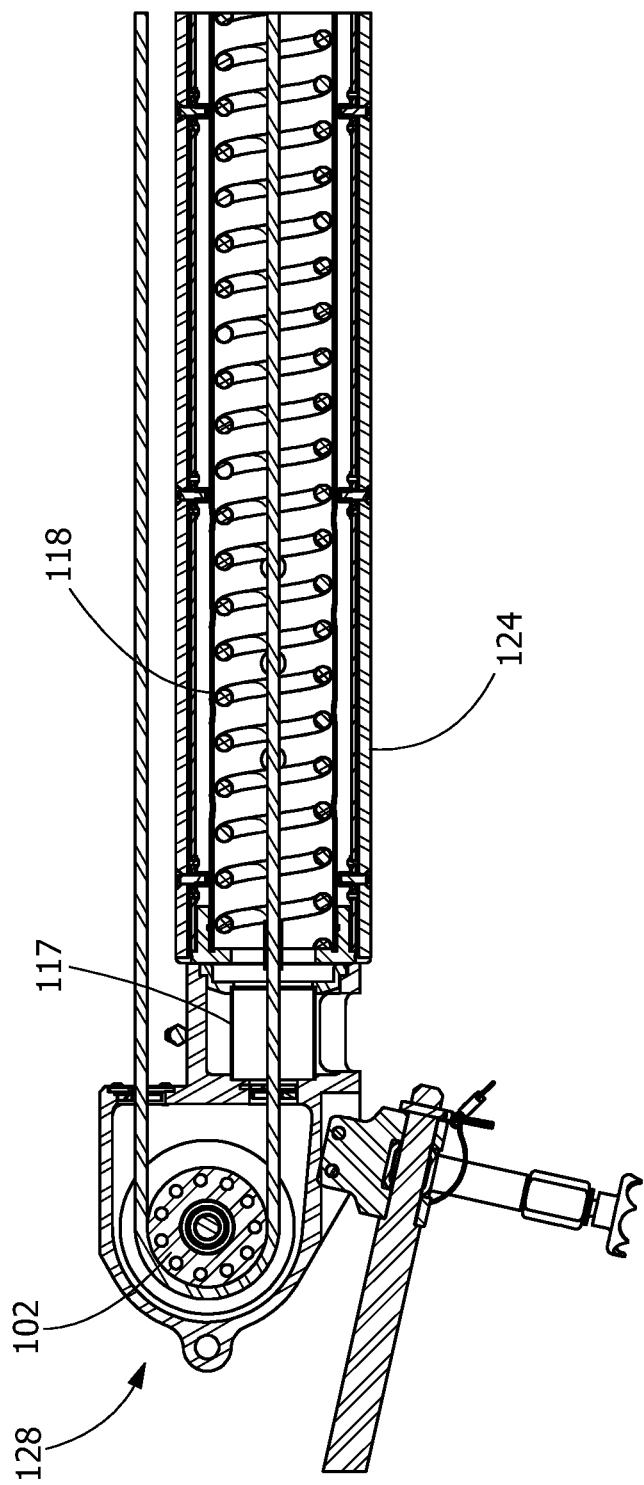
FIG. 4 is a cross-section taken along line 4-4 from FIG. 2

As shown in FIGS. 1-9, 9A, and 10-11, the present disclosure provides a portable pneumatic aerial vehicle launcher or launching system 10 (FIG. 1), such as unmanned aerial vehicles (UAVs) 12 having an open platform which allows UAVs of varying shape and size to be launched from rest to flight speed in a short distance. The launcher 10 includes three major subcomponents; a rail 14, a carriage 16, and a device or pneumatic assembly 18. The carriage 16 features the components necessary to properly hold the UAV 12 during acceleration, and completely release the UAV at the end of the rail 14. The rail 14 includes a guiding track for the carriage 16, and features an enclosed pneumatic piston system which with the assistance of two elongate flexible members such as guiding ropes or cables 103 and pulleys 102 provides a 1:1 ratio of movement between a piston 101 and carriage 16 on the rail 14. In one embodiment, the ratio of movement between guiding ropes or cables 103 and pulleys 102 can be different than 1:1 to achieve a mechanical advantage. For improved portability, the rail 14 is made of sections or portions 124 which are removable without the need for tools, allowing for portability and the ability of a single operator to assemble and disassemble. Other components, such as guiding ropes or cables 103 can be selectably assembled and disassembled from the carriage 16 without the need for tools. Additionally, the rail 14 features two front legs 108 and a rear leg bar which are adjustable in both angle and length, allowing usage in all sorts of terrain. In one embodiment a different number of legs may be utilized. To power the pneumatic piston, the pneumatic assembly features a system allowing for the storage, regulation, and release of pressurized gas. Within this pneumatic system, a launch valve, high pressure "storage" reservoir, low pressure "launch" reservoir, and a series of pneumatic controls facilitates distributing a specific volume of gas at a user-controlled pressure to the pneumatic piston, enabling the launch event.

The term "UAV" or "launch vehicle" and the like may be used interchangeably.

The term "rail 14" and "rail subassembly 100" and the like may be used interchangeably.

The term "without tools," "without the need for tools" and the like is believed to be self explanatory, at the least, the magnitude of forces and level of manual dexterity associated with successfully achieving assembly and disassembly associated with a given task would be possessed by any operator that would otherwise be able to use tools in order to achieve the same task.

The launcher of the present disclosure provides a safer and more sustainable alternative to traditional UAV launching devices using a series of high load springs. Additionally, the launcher of the present disclosure provides a safer and more useable alternative to a traditional pneumatic UAV launching device.

Rail 14 comprises a rail subassembly 100 which includes rail sections or portions 124, front and rear end caps 126, 128, cable 103, legs 108, and pneumatic piston 101, as shown in FIGS. 2-8. During the launch event, pressurized gas enters the inlet 109 (FIG. 7) of the rail 14 from launch reservoir 316 (FIG. 1), which drives the piston 101 (FIG. 3) from the front of the rail subassembly 100 to the back of the rail subassembly. At the rear of the rail subassembly 100, an outlet filter, such as a wire mesh filter 117 (FIG. 4) in fluid communication with the passageway 130 (FIG. 3) prevents external debris from entering the passageway and reaching the piston 101, evenly distributes the pressurized gas flow and dampens the noise of the pressurized gas displaced by the piston 101. The piston 101 is attached to two cables 103, which are attached at the front and back of the carriage assembly 200. To minimize the need for cleaning and lubrication, the piston's 101 seals utilize a dry sealing method by being constructed of a low-friction polymer. By using a low-friction polymer in lieu of a traditional seal made of an elastomer, no lubricants are needed, therefore making the piston self-cleaning and resistant to usage in extreme environments. Additionally, in one embodiment, the two cables 103 are made of a coated polyamide fiber braid, which resists moisture absorption common in fiber ropes, is less prone to stretch-related fatigue as is common in other rope materials, and upon failure doesn't whip violently as is the case with metallic wire rope. When the piston 101 moves towards the rear of the rail subassembly 100, the pulley 102 guides the cable 103 outside and above the rail subassembly 100, pulling the carriage assembly 200 from the rear to the front of the rail subassembly 100. Prior to reaching the end of the rail subassembly 100, the piston 101 strikes an impact spring 118 (FIG. 4), which quickly but safely brings the carriage assembly 200 to a stop.

Figure 5:
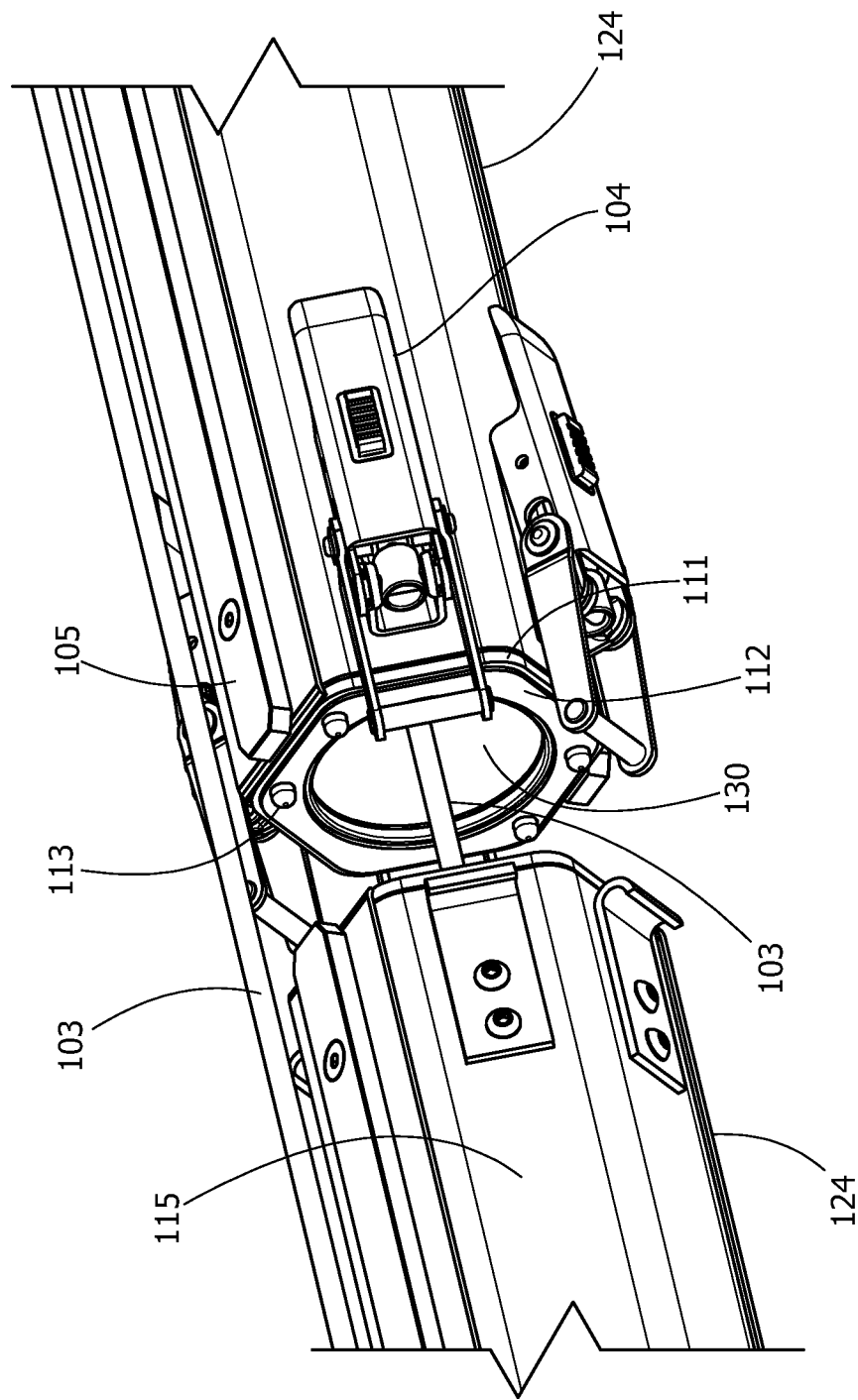
FIG. 5 is an upper perspective view of disassembled mating portions of a rail.
Figure 6:
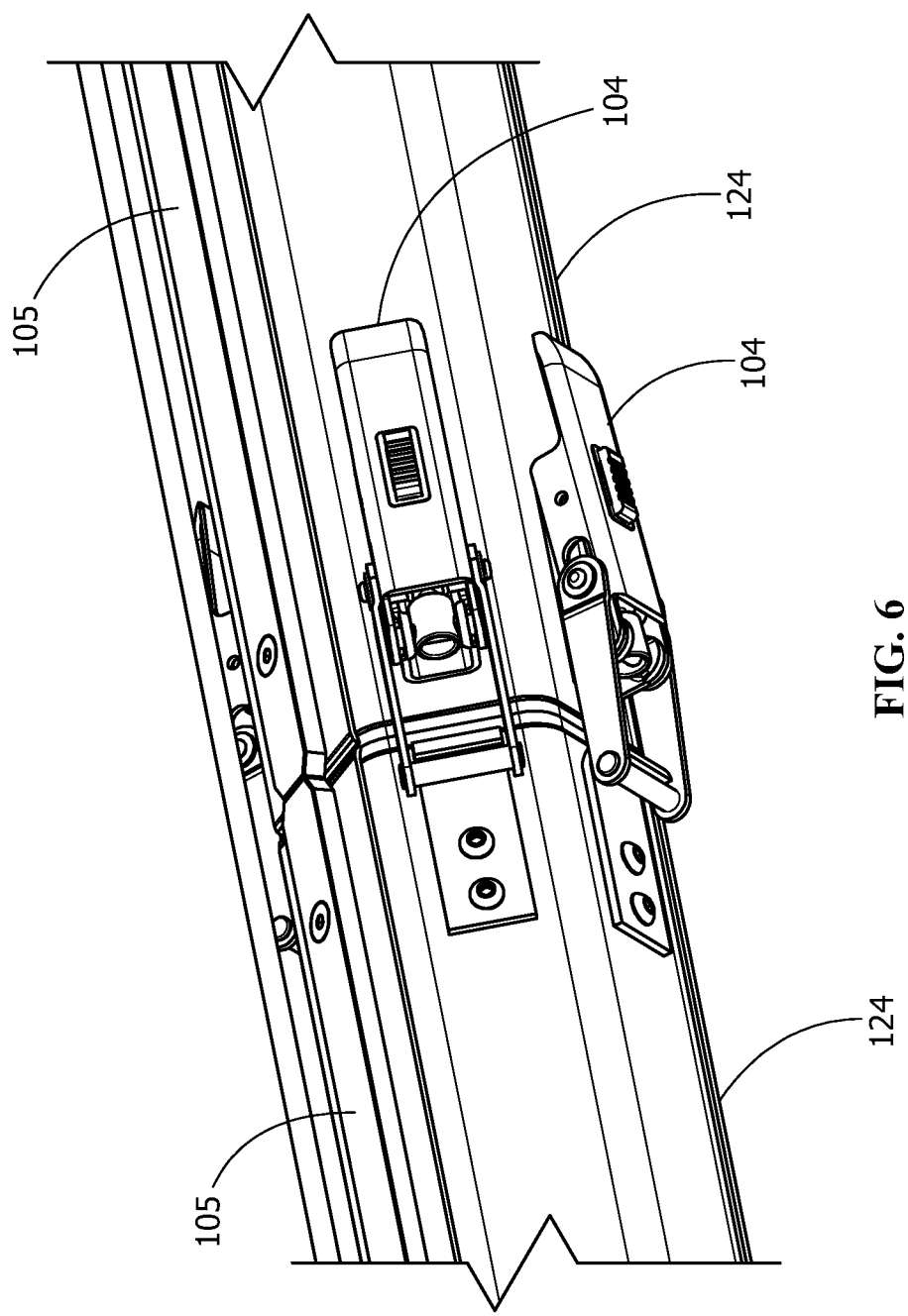
FIG. 6 is an upper perspective view of mating portions of the rail of FIG. 5 assembled together.

As shown in FIGS. 5 and 6, the rail subassembly 100 can include, but is not limited to, four separate sections or portions 124, which are attached to each other using latches 104, such as over-center latches. These latches compress the ends of each section together, creating a fluid tight seal. To achieve a fluid tight seal, a male- and female-coupler 111 featuring a gasket 112 are used, with anti-rotation features such as alignment pins 113 and corresponding openings to receive the pins to prevent rotation of facing ends of adjacent rail sections or portions once the male and female portions of the coupler are assembled together. To prevent the carriage assembly 200 from rotating during the launch event, an anti-rotation feature such as a carriage guide rail 105 is positioned on both the top and bottom of the rail subassembly 100, which slidably engages corresponding slots formed in guide blocks 204 (only one guide block 204 is shown in FIG. 9) of the carriage assembly, providing a straight track for the carriage assembly 200 (FIG. 9) to follow. In one embodiment, at the front end of the rail subassembly 100, a raised section of the carriage guide rail 105 triggers the engagement portion 209 (FIG. 9) to release its arms 214, allowing the arms to move free of the UAV 12 (FIG. 9A) when the piston 101 strikes the impact spring inside the rail.

In one embodiment, the outer structural rail tubes 115 (FIG. 5) are made of epoxied composite (carbon) fiber to minimize the weight of the rail subassembly 100 while retaining tensile and compressive strength. To counteract the weakness of carbon fiber tubes under tensile loading by its ends; all couplers 111, and carriage guide rails 105 are designed to eliminate point loads, maximizing load distribution across the entire tube. This design consideration improves the overall strength of the rail subassembly 100 when using other materials for the outer structural rail tubes 115, as the maximized load distribution reduces the risk of fracture or yield regardless of the material. Additionally, in one embodiment, the frontmost section of the rail subassembly 100 is filled with a structural filler to prevent shear loads on the structural rail tube 115 as a result of the carriage assembly 200 decelerating at the end of the rail subassembly and its interfacing components bearing down on the tube's walls.

To support the rail 14, two front legs 108, and rear leg bar 119 suspend the rail off the ground, and are adjustable to provide the optimal launch angle. Other leg arrangements can be used to support the rail. To achieve both angular and height adjustability, the front legs 108 feature telescoping tube clamps, allowing sufficient height adjustment to achieve any desired incline, as well as angular adjustment hinges 107 (FIG. 7) to position/balance itself on an incline/decline. Additionally, the angular adjustment hinges 107 feature shear pins to prevent damage to the leg and rail interface in the event the leg became snagged during a launch. When in storage/transport, the hinges 107 can be adjusted to allow the legs 108 to be parallel to the rail, providing a compact package that permits handling by a single operator. Additionally, the legs 108 and leg bar 119 feature pivoting removable and interchangeable shoes, sometimes referred to as feet, with a soft rubber option for hard surfaces (e.g., concrete, asphalt), as well spiked cleats for soft terrain (e.g., sand, dirt, snow). To prevent the front legs 108 from separating from one another, a wire rope 116 with crimped loops are permanently affixed to a mounting point on each leg.

Present on the rear leg bar 119 (FIG. 8) are adjustable threaded rods 120, allowing for fine height adjustment; as well as pins 121 to completely remove the leg bar from the rail during storage/transport. Attached to the leg bar 119 is a backing rod 122, which may be used to back the rail 14 against a tree, wall, or other stationary surface. The backing rod 122 also features a bumper on its distal end, which helps to dissipate the energy stored in the rod 122 during the launch event. When used in soft terrain, ropes can be attached to the rail 14 using mounting loops and are attached to stakes to prevent longitudinal movement. For precise adjustment, an inclinometer 110 (FIG. 7) is attached to the front end cap 126, providing precise angle display relative to a horizontal plane, as well as a level indicator 106 to ensure the rail 14 is level, i.e., corresponding to a predetermined reference angle (roll) relative to longitudinal axis 180 (FIG. 2) of the rail.

As shown in FIG. 9, carriage 16 includes a carriage assembly 200. In one embodiment, all structural components of carriage assembly 200 can be composed of sheet metal, but may be manufactured using advanced manufacturing methods and materials which allows for a reduction in weight while not compromising strength.

As further shown in FIG. 9, carriage 16 comprises a support member 20 including an engagement portion 201 for releasably engaging the UAV or aerial vehicle 12 (FIG. 1). In one embodiment, such as shown in FIG. 9, engagement portion 201 includes a guide channel 208 for engaging the UAV (FIG. 9A) and preventing the UAV from sliding laterally relative to the carriage 16 during a launch event. In one embodiment, the guide channel is adjustable for accommodating differently sized UAVs. In one embodiment, the guide channel 208 moves out of a path of the aerial vehicle, such as by mechanical linkages or springs (not shown) as the aerial vehicle reaches a predetermined spacing from the front end (at front end cap 126 (FIG. 2)) of the rail 14, or the carriage 16 begins decelerating at the front end of the rail, preventing an impact with the UAV. In one embodiment, such as further shown in FIG. 9, engagement portion 201 includes one or more protrusions, such as mounting pins 212 for engaging the UAV (FIG. 1) in preparation of a launch event. It is appreciated by those having ordinary skill in the art that other features may be incorporated in engagement portion 201, which features to be compatible with corresponding features of the UAV in order to engage and secure the UAV in preparation for and during a launch event. Upon reaching the end of the rail 14 (FIG. 1) (and decelerating) during a launch event, the UAV (FIG. 1) will leave the carriage 16 (FIG. 1) and begin flight. The carriage assembly 200 is attached to a pneumatic piston 101 (FIG. 3) located within a passageway 130 (FIG. 3) formed in the rail using two elongate members such as ropes or cables 103 (FIG. 3) which are affixed to the carriage assembly at predetermined positions, such as by using fastening devices such as clevis anchors 203 on both the front and rear of the carriage assembly. The passageway 130 provides directional control of pressurized gas from a pressurized gas source 303 (FIG. 10) for driving the piston 101.

In one embodiment, as further shown in the rear of the engagement portion 201 of carriage assembly 200 in FIG. 9, a rear support arm 207 prevents the UAV (FIG. 9A) from slipping past the carriage 16 when the launch event commences. Slipping prevention is achieved by the two pads 202 and a knuckle 206. Knuckle 206 constrains the pads to move in a direction toward or away from each other. In one embodiment, each pad has a corresponding knuckle. The freedom of movement provided by the knuckle's universal ball joint permits locking the tail of the UAV (FIG. 9A) in place with the pads 202. In one embodiment, this construction provides a universal mounting geometry that is able to affix to differently sized and shaped aerial vehicles. In one embodiment, this construction prevents roll and yaw of the aerial vehicle, as well as lift separation of the aerial vehicle from the launcher prior to controllable disengagement therefrom. In one embodiment, pads 202 may include protrusions 212. Upon decelerating at the release point on the rail's end, the arm 207 rotates at least partially in a direction of movement of the UAV (FIG. 9A) or launch vehicle, as well as downwards relative to the carriage 16, out of a path of the aerial vehicle as the aerial vehicle reaches a predetermined spacing from the front end (at front end cap 126 (FIG. 2)) of the rail 14, or the carriage 16 begins decelerating at the front end of the rail, preventing an impact with the UAV's tail elevator. In one embodiment, carriage assembly 200 includes an engagement portion 209 having support arms 214 and pads 202 and/or protrusions 212 operating in a manner similar to that previously discussed with regard to engagement portion 201, although in another embodiment, support arms 214 may independently rotate outwardly or perpendicular to the direction of travel of the carriage assembly. Any combination of engagement portions 201, 209 and guide channels 208 may be used as desired or appropriate to engage the UAV (FIG. 9A) for a launch event.

As further shown in FIG. 9, to prevent the UAV (FIG. 9A) from rolling, the carriage assembly 200 has anti-rotation features such as guide blocks 204 that slidably engage with carriage guide rails 105 when assembled together, which cradle the guide rail on the top and bottom of the launcher's rail sections 124. For improved portability, the tail section (if present) of the carriage assembly 200 can be detached by removing the quick release pins holding the tail section and its interface tabs 205 to the rest of the carriage assembly.

Figure 7:
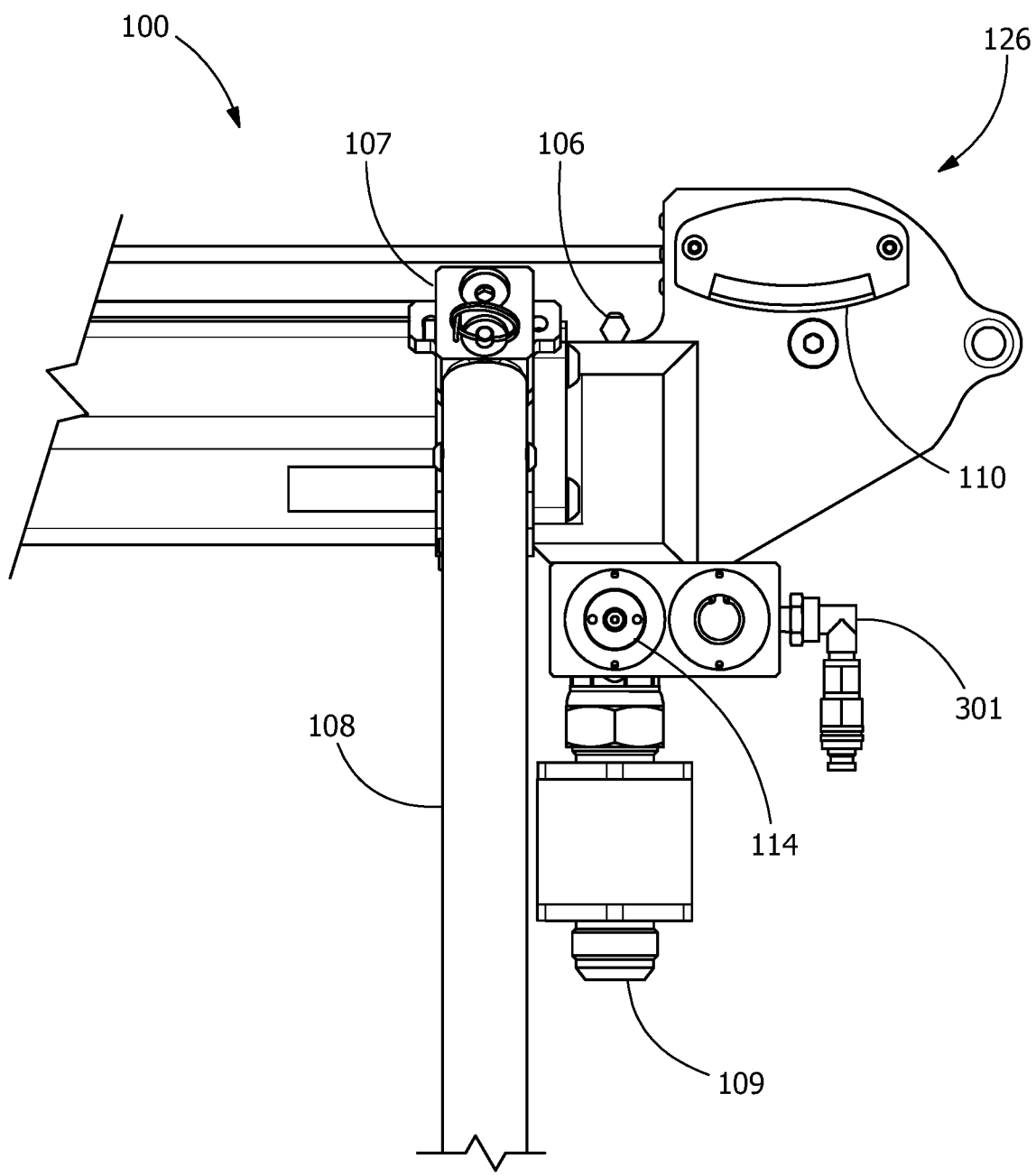
FIG. 7 is an enlarged partial elevation view of the front end of the rail of FIG. 2.
Figure 8:
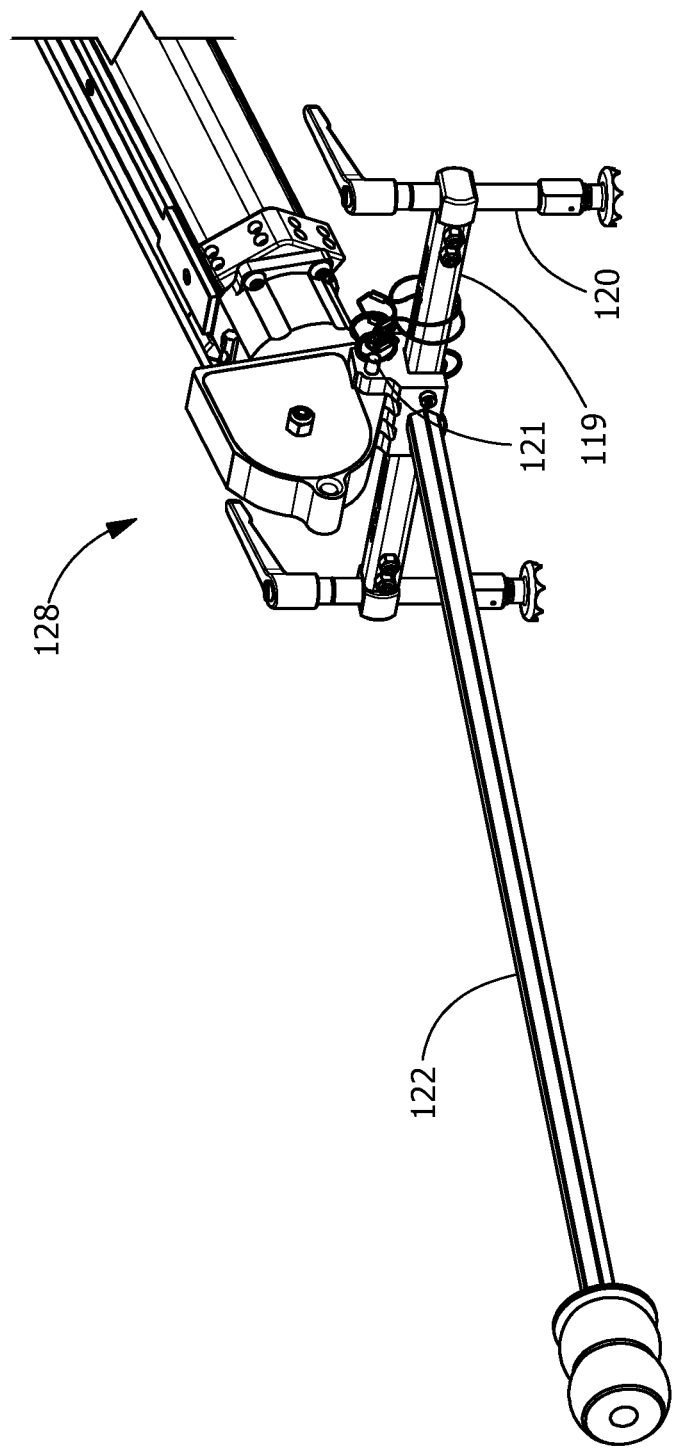
FIG. 8 is an enlarged partial upper perspective view of the rear end of the rail of FIG. 2.

As further shown collectively in FIGS. 10 and 11, the pneumatic assembly 18 includes an integrated launch valve 301, a launch reservoir 316 (FIG. 1), and a pneumatic control system 305 including a pneumatic control panel 314. The launch valve 301 outlet shown in FIG. 7 is attached to the end cap 126 inlet of the rail subassembly 100 in fluid communication with passageway 130 (FIG. 3), providing a direct interface into the passageway without a need for adapters. On the launch valve 301 inlet (FIG. 11), the end of the pressurized launch reservoir 316 (FIG. 1) is attached. To activate the valve, a pneumatic pilot controlled by the pneumatic control panel 314 (FIG. 11) is utilized, which upon receiving the "pressure signal" via a conduit (FIG. 1) extending between the launch valve 301 and the pneumatic control panel 314 (FIG. 11), the launch valve becomes unbalanced and is activated, forcing the launch reservoir's pressurized gas to be deployed into the piston 101, launching the UAV. The launch valve 301 features a visual pressure indicator 114 on the launch reservoir side of the valve, indicating to the operator that the valve is pressured and ready to be actuated. Additionally, the usage of the launch reservoir 316 in the form of a conduit, such as a hose (FIG. 1) allows the pneumatic control system 305 to be located away or spaced apart from the launch valve 301 of the rail subassembly 100, mitigating any potential safety hazards if the operator were to be in close proximity to the aerial vehicle during both the launch event or termination of the launch event.

FIG. 10 shows the pneumatic control system 305 including a pneumatic control panel 314, which includes a series of controls and safeguards to safely and reliably permit a high pressure stored gas to be deployed to the launch reservoir at a user-controlled pressure. The high pressure gas is stored in the high pressure cylinder 303, which allow for several launches to be performed per cylinder without need for recharging. It is to be understood that the number of launches is a function of the size and pressure of numerous parameters, including the size and pressure capacity of the high pressure cylinders and can be adjusted as desired, as can the launch pressure utilized to accommodate aircraft of differing weights and required takeoff speeds. The pneumatic control system case 312, shown in FIG. 10, contains and protects all elements of the pneumatic control system 305 from environmental factors such as weather and transport damage. To safely secure high pressure cylinders 303, mounting brackets 308 and clamps 302 are permanently affixed to the case. As a visual aid during assembly and usage, a removable wind vane and panel-illuminating light are affixed to the inside of the pneumatic control system case 312.

In the pneumatic control system assembly 305, including a pneumatic control panel 314, a series of pneumatic controls are utilized. A high pressure charge port 307 is used as the interface to charge one or more high pressure cylinders 303 (in FIG. 10, only one high pressure cylinder is shown)

with pressurized gas. In one embodiment, the high pressure cylinders can be charged to 5000 psig. In other embodiments, the high pressure cylinders can be pressurized to other pressure magnitudes, as desired and appropriate to maximize the amount of launches without need for recharging. The pressure in the high pressure cylinders is visible to the user or operator via the pressure gauge 306. A high pressure shutoff valve 304 protects all low-pressure components from the high pressure gas when the system isn't in use. When open, the high pressure shutoff valve 304 feeds high pressure gas to the high-to low-pressure regulator 309. To indicate the regulated pressure, a gauge 306 displays the pressure to the user on the pneumatic control panel. In one embodiment, pneumatic control panel 314 includes an intuitive panel layout, with color-coded subsystem labeling.

When the launch reservoir 316 (FIG. 1) is ready to be filled, the first of a series of hand-operated switches 310 provides pressurized gas to the launch reservoir. In one embodiment, the switches 310 are a combination of locking and momentary pneumatic rocker switches. In other embodiments, they may be push buttons, pedals, or levers, as well as any configuration of the aforementioned switches but utilizing electrical actuation. In one embodiment, the launch reservoir 316 (FIG. 1) is a conduit, such as a hose, allowing the pneumatic control system or pneumatic control assembly 305 to be set a distance away from the rail 14. The pressure in the launch reservoir is indicated by a pressure gauge 306B. When the user is ready to initiate a launch, a configuration of two-hand safety switches 310 is actuated, such as by toggling, providing pressure to the launch valve's 301 pilot port, releasing the launch reservoir's pressurized gas into the rail subassembly 100. In the event the launch is to be aborted, and the launch reservoir is pressurized, the launch reservoir drain valve 318 can be opened to release the pressurized gas stored in the launch reservoir to atmosphere. By utilizing the pneumatic control panel 314's series of switches, valves, and regulators, the redundant system provides safeguards to prevent damage to components and ease of operator usage.

As a result of arrangement of the launcher of the present disclosure, a single operator can assemble the launcher and launch an aerial vehicle quickly, in extreme environmental conditions, and have a minimal launch recovery time. In one embodiment, the launch recovery time is less than one minute. The reusability of the launcher is dependent on the fill pressure of the high pressure cylinders 303, as a higher high pressure fill will allow for more launches before all pressurized gas is used. When the high pressure cylinder 303 is exhausted, it can be recharged quickly and repeatedly.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An aerial vehicle launcher comprising:
  a rail having a first end and a longitudinal axis;
  wherein the launcher further comprises a piston movable in a passageway formed in the rail, the piston connected to a carriage by at least two elongate flexible members;
  the carriage having a support device for releasably engaging the aerial vehicle;
  wherein upon the carriage and the aerial vehicle approaching one end of the rail, the support device controllably disengaging the aerial vehicle, permitting the aerial vehicle to be launched from the launcher; and
  a pneumatic device connected to a pressurized gas source;
  wherein the pneumatic device controllably provides pressurized gas from the pressurized gas source to the passageway for drivingly moving the piston, the carriage, and the aerial vehicle along the rail for launching the aerial vehicle;
  wherein the pneumatic device includes a reservoir for holding gas pressurized to a predetermined level in preparation of launching the aerial vehicle the pressurized gas in the reservoir providing the driving force for launching the aerial vehicle.

2. The aerial vehicle launcher of claim 1, wherein the rail includes a circular tube with the piston nested inside a structural, noncircular tube;
  wherein the structural, noncircular tube is reinforced with load-distributing features conducive for use with thin-walled tubes.

3. The aerial vehicle launcher of claim 1, wherein the rail is comprised of a plurality of disassemblable, interconnected portions having opposed ends, wherein corresponding ends of adjacent portions form a fluid tight seal therebetween.

4. The aerial vehicle launcher of claim 3, wherein the adjacent portions and the at least two elongate flexible members can be assembled and disassembled without the need of tools.

5. The aerial vehicle launcher of claim 3, wherein corresponding ends of the adjacent portions include alignment features preventing relative movement of the adjacent portions upon assembly.

6. The aerial vehicle launcher of claim 1, wherein the piston utilizes self-cleaning dry seals, preventing the need for lubrication and cleaning.

7. The aerial vehicle launcher of claim 1, wherein the carriage and the rail have an anti-rotation feature to prevent relative rotation therebetween about the longitudinal axis.

8. The aerial vehicle launcher of claim 1, wherein opposed end caps of the rail comprises at least one of:
  a pulley for guiding a corresponding flexible member;
  internal and external flexible member wipers, the internal and the external wipers preventing debris from entering the passageway from an external environment by way of the flexible member;
  internal air passageways for directional control of gas flow;
  a launch valve interface port;
  wherein a direct interface provides access into the passageway without need for adapters;
  wherein the direct interface prevents any gas flow restriction between the outlet and the passageway;
  an outlet filter for preventing external debris from entering the passageway; and
  an inclinometer for providing rail angle adjustment.

9. The aerial vehicle launcher of claim 1, wherein the rail comprises:
  a plurality of adjustable legs for positioning the longitudinal axis of the rail at a predetermined acute angle relative to a horizontal plane and for positioning the rail at a predetermined reference angle (roll) relative to the longitudinal axis; and interchangeable feet.

10. The aerial vehicle launcher of claim 1, wherein the support device comprises:

one or more first engagement portions to secure the aerial vehicle;

wherein at least one of the one or more first engagement portions are movable at least partially in a direction of movement of the launch vehicle relative to the carriage as the carriage reaches a predetermined spacing from the first end of the rail, or the carriage begins decelerating at the first end of the rail;

wherein at least one of the one or more first engagement portions has a universal mounting geometry capable of being affixed to differently sized and shaped aerial vehicles.

11. The aerial vehicle launcher of claim 10, wherein the pneumatic-valve comprises:

pneumatic actuation;

an integrated visual pressure indicator; and a direct interface into the outlet passageway without need for adapters, preventing airflow restrictions.

12. The aerial vehicle launcher of claim 10:

wherein the one or more engagement portions prevent roll and yaw of the aerial vehicle, as well as lift separation of the aerial vehicle from the launcher prior to controllable disengagement therefrom;

opposed fastening devices;

wherein the fastening devices are positioned at predetermined positions, each fastening devices affixed to a corresponding flexible member of the at least two flexible members; and wherein the at least two flexible members can be assembled/disassembled from the carriage.

13. An aerial vehicle launcher comprising:

a rail having a first end and a longitudinal axis;

wherein the launcher further comprises a piston movable in a passageway formed in the rail, the piston connected to a carriage by at least two elongate flexible members;

the carriage having a support device for releasably engaging the aerial vehicle;

wherein upon the carriage and the aerial vehicle approaching one end of the rail, the support device controllably disengaging the aerial vehicle, permitting the aerial vehicle to be launched from the launcher; and a pneumatic device connected to a pressurized gas source;

wherein the pneumatic device controllably provides pressurized gas from the pressurized gas source to the passageway for drivingly moving the piston, the carriage, and the aerial vehicle along the rail for launching the aerial vehicle;

wherein the pneumatic device includes a reservoir for holding gas pressurized to a predetermined level in preparation of launching the aerial vehicle, the pressurized gas in the reservoir providing the driving force for launching the aerial vehicle;

wherein the rail includes a circular tube with the piston nested inside a structural, noncircular tube;

wherein the structural, noncircular tube is reinforced with load-distributing features conducive for use with thin-walled tubes.

14. The aerial vehicle launcher of claim 1, wherein the pneumatic device includes a first conduit and a second conduit, each of the first conduit and the second conduit in selective fluid communication with a launch valve and a pneumatic control panel for actuating the launch valve.

15. The aerial vehicle launcher of claim 14, wherein the pneumatic device connected to a pressurized gas source including the pneumatic control panel is enclosed in a transport-safe protective case.

16. The aerial vehicle launcher of claim 15, wherein the launch valve and the pneumatic control panel are spaced apart from each other, permitting the control panel to be remote from the launch valve during launch termination.

17. The aerial vehicle launcher of claim 15, wherein the pneumatic control panel includes switches forming a redundant system providing safeguards to prevent damage to components and ease of operator usage.

18. The aerial vehicle launcher of claim 15, wherein the pneumatic control panel includes an intuitive panel layout with color-coded subsystem labeling.

19. The aerial vehicle launcher of claim 15, wherein the pressurized pressure source is capable of powering a plurality of launch events.

20. The aerial vehicle launcher of claim 15, wherein the pneumatic control panel permits adjustment of a launch pressure.

21. A method for launching an aerial vehicle from the aerial vehicle launcher of claim 1, comprising:

slidably securing a carriage to a rail having a longitudinal axis;

positioning the rail at a predetermined acute angle relative to a horizontal plane;

releasably engaging the aerial vehicle to the carriage;

controllably providing pressurized gas for drivingly moving the carriage and aerial vehicle along the longitudinal axis for launching the aerial vehicle; and controllably disengaging the aerial vehicle from the carriage in response to the carriage and the aerial vehicle being a predetermined spacing from an end of the rail immediately prior to launch of the aerial vehicle.

22. The method of claim 21, wherein controllably providing pressurized gas for drivingly moving the carriage and aerial vehicle along the longitudinal axis for launching the aerial vehicle includes controllably providing pressurized gas to a passageway formed in the rail, wherein a piston drivingly movable by the pressurized gas is connected to the carriage for drivingly moving the carriage and aerial vehicle along the longitudinal axis for launching the aerial vehicle.

23. The aerial vehicle launcher of claim 10, wherein the support device comprises:

one or more second engagement portions are nonmovably secured to the carriage during a launch event.

* * * * *